UNITED STATES PATENT OFFICE.

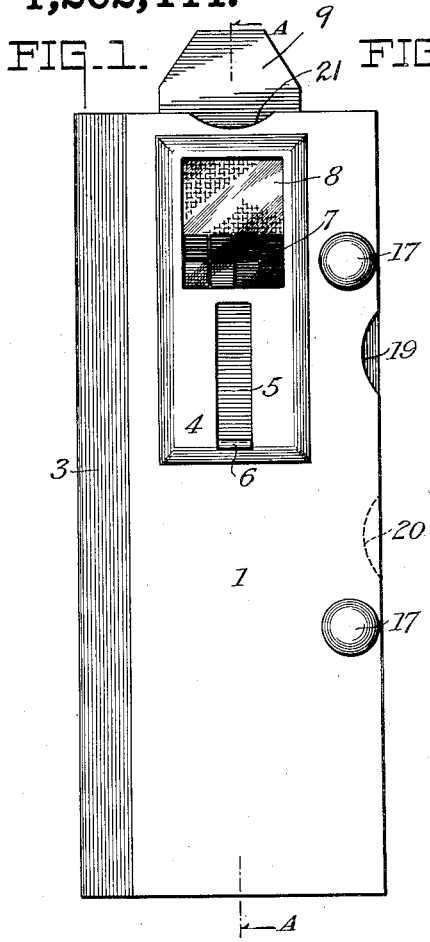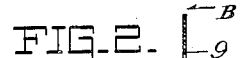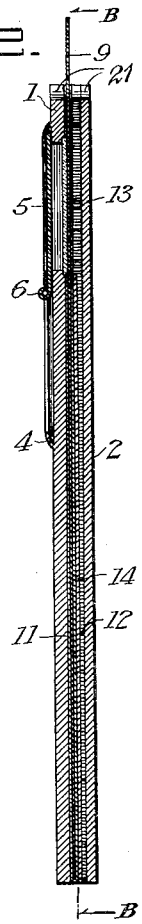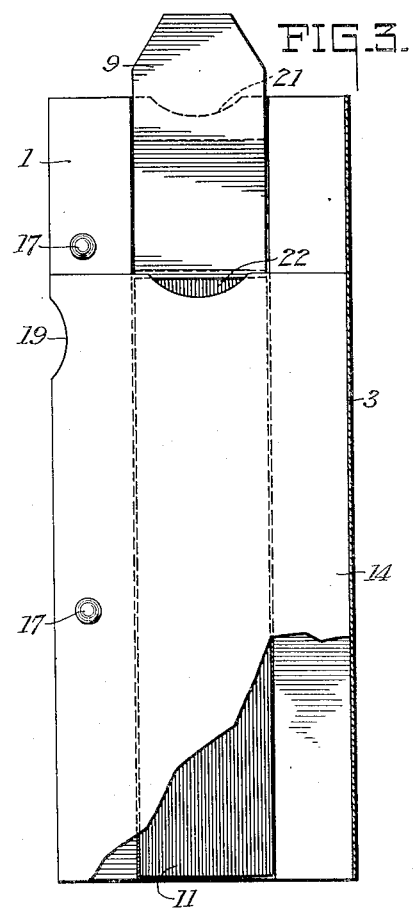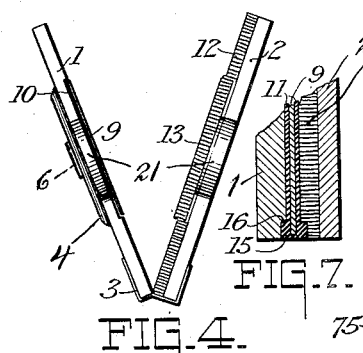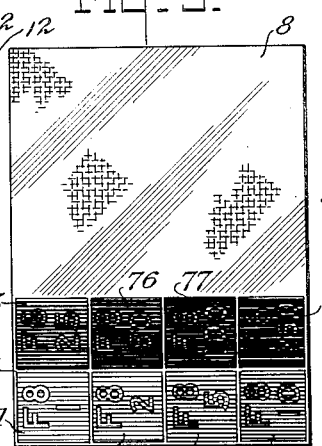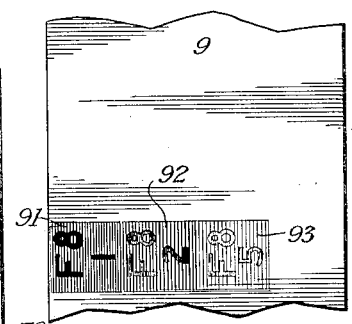
J. G. CAPSTAFF.
ACTINOMETER.
APPLICATION FILED APR. 27, 1917.
1,262,444.
Patented Apr. 9, 1918.
INVENTOR
John G. Capstaff,
BY Clayton L. Jenks
ATTORNEY
WITNESSES:

JOHN G. CAPSTAFF, OF ROCHESTER, NEW YORK, ASSIGNOR TO EASTMAN KODAK COMPANY, OF ROCHESTER, NEW YORK, A CORPORATION OF NEW YORK.

ACTINOMETER.

1,262,444.   Specification of Letters Patent.   Patented Apr. 9, 1918.

Application filed April 27, 1917. Serial No. 164,889.

*To all whom it may concern:*

Be it known that I, JOHN G. CAPSTAFF, a subject of the King of Great Britain, residing at Rochester, in the county of Monroe and State of New York, have invented certain new and useful Improvements in Actinometers; and I do hereby declare the following to be a full, clear, and exact description of the same, reference being had to the accompanying drawings, forming a part of this specification, and to the reference-numerals marked thereon.

This invention relates to instruments for measuring light, particularly actinometers for determining the strength of light for photographic purposes. It further relates to improvements in that type of actinometer wherein the light to be tested passes for a definite time through an exposure element having a series of areas of successively increasing light transmitting power onto a sensitive photographic surface. Such surface may be a strip of printing paper or film. The parts of the surface under the different areas receive different amounts of light and produce photographic effects which depend on the strength of the tested light. For example, if printing paper be used, a series of tints of decreasing darkness will appear thereon. The least visible tint is noted, and also the area under which it is produced. After obtaining this information, it has, however, been necessary heretofore to refer to tables or to make calculations before the strength of the light could be determined, the photographic exposure data being thus obtained indirectly.

One object of my invention is to provide an actinometer which will be "direct reading" so that the operator, after making a test, can see on the sensitive surface printed characters which show directly data for making satisfactory photographic exposures on subject illuminated by the tested light, neither reference to tables nor calculations being necessary. Such characters may give the relative aperture of the lens at the time of exposure. Another object of my invention is to provide an exposure element for an actinometer comprising areas of graded light transmitting power, each area having characters therein of different light transmitting power than the rest of the area and the difference in light transmitting power between each area and its contained characters being substantially uniform throughout the series of areas, so that the characters will be legibly printed by the time that the surrounding area gives a faintly visible tint. Another object of my invention is to provide an observation window in the actinometer through which the tinted sensitive surface or paper may be safely and clearly inspected, the window being preferably of a material that is considerably opaque to actinic light but transparent to non-actinic light. This enables a printed strip to be inspected without danger of the test tints being fogged or obscured by actinic light. Another object is to provide a combined shutter and protective cover which can be moved out of the way while a test is being made, moved over the exposure element while inspecting the test strip through the window, and moved over both the exposure element and window to protect them during carriage. Another object is to provide an actinometer in which an envelop carrying a strip of sensitive material is held stationary and in alinement with the exposure element and inspection window, so that the strip can be drawn out rectilinearly as required with minimum danger of tearing or fogging. Another object is to provide an actinometer which can be quickly and easily opened, closed, and loaded with test strips of sensitive material. Further objects will hereinafter appear.

In the accompanying drawing in which like reference numerals designate similar parts throughout the several views:

Figure 1 is a plan view of my actinometer.

Fig. 2 is a central longitudinal section thereof taken upon the line A—A of Fig. 1.

Fig. 3 is a section taken upon the line B—B of Fig. 2, parts being broken away for clearness.

Fig. 4 is an end elevation of my actinometer with the plates thereof spread apart in the open position.

Fig. 5 is a detail view showing in plan the exposure element and the observation window.

Fig. 6 is a diagrammatic showing of a piece of test paper bearing a set of printed characters and areas resulting from a test.

Fig. 7 is a fragmentary central section indicating a means for holding lower end of the envelop stationary.

The preferred form of my actinometer, which I have chosen for purposes of illustration, comprises a casing having two plates 1, 2, connected at one longitudinal edge by a hinge 3 which may be merely a band of fabric suitably connected to the plates. Upon the plate 1, preferably near one end thereof, is located a plate or cover 5 actuated, by means of a finger-engaging knob 6, back and forth along a guideway 4, which may consist of a section embossed from the plate 1 or strips fastened thereon. The plates 1, 2 and guideways 4 are made of any suitable opaque material such as stout cardboard.

In line with the cover 5 there is an opening through plate 1 in which are located the exposure element 7 and the observation window 8. The arrangement is such that both said element and window may be open as shown in Fig. 1; or cover 5 may be slid to protect the element; or thirdly, it may be moved to entirely cover both the element and window. The guideway 4 is so constructed that it forms a substantially light trapped joint with the edges of cover 5.

The exposure element which forms a very important part of my invention comprises a series of graded densities 71, 72, 73, 74, 75, 76, 77, and 78. The light transmitting power of these areas varies progressively from area 71 to area 78, the former passing a large percentage of the incident light and the latter passing only a small portion. Upon each of these areas are characters which indicate the photographic exposure data corresponding to that area. These characters (which for clearness are omitted from Fig. 1) are of different light transmitting power than the areas which surround them, and in the preferred form of my invention the characters are more transparent than the areas. Now, if these characters throughout the whole set of areas were of the same light transmitting power and the strip of test paper were exposed under said areas, the characters would all begin to print at the start of the test exposure, and under certain conditions which might easily occur in practice, the characters appearing on the least visible tint would be over-printed and difficult to read. To prevent this, the characters on any given area bear a definite relation to the density of that area; the difference in light transmitting power between any area and its contained characters being substantially the same as the difference between any other area and its corresponding characters. In other words, the differential is uniform throughout the series. Since the difference conforms to the printing speed of the paper, the characters in any area will be printed with a maximum legibility upon the test paper at the moment when the rest of the area just begins to print. Thus clear numerals and letters will always appear on the least visible tint.

The particular characters which appear upon the areas are chosen to correspond to the light transmitting power of the areas in relation to the sensitiveness of the test paper and the duration of the test exposure. In the examples given, I have indicated upon each area the exposure data in the form of the relative aperture of the lens and the exposure time corresponding to such aperture; thus in area 71 characters $\frac{F8}{1}$ a placed, in 72, $\frac{F8}{2}$ appears, in 73, $\frac{F8}{5}$ and so on. In order to secure the maximum size of characters in the minimum of space, I have shown in Fig. 5 the denominators of the fractions indicating the time of exposures. Thus 2, 5, 10, 25, 50 100 and 250 mean exposure of 1/2, 1/5, 1/10, 1/25, 1/50, 1/100 and 1/250 seconds. If desired, the whole fractions could be used in place of the denominators only. The exposure element may be made in any preferred way, such as by photographically copying an original plate or master chart or by casting in lamp black.

The window 8 which may be of glass, celluloid, gelatin, etc., is colored so that it will be substantially transparent to non-actinic light, but will be relatively opaque to the actinic rays which would affect the sensitive photographic material or paper which is to be examined through the window. I have found that with the ordinary photographic materials used in my actinometer a yellow window is very effective. On the inner face of the plate 1 is a longitudinal groove 10 constituting a pathway which extends across and beneath the exposure element 7 and window 8. One part of this pathway is covered over by a thin wall 14 forming a chamber in which an envelop 11 containing the strip of sensitive material or paper 9 may be longitudinally slid during the loading operation. The open end 22 of the envelop will then be adjacent the exposure element 7 and the envelop, element, and observation window will all be in a straight line so that a rectilinear pull on the strip of paper 9 will draw it under the element and window with a minimum danger of tearing.

The inner side of the plate 2 is lined with suitable fabric, such as felt or velvet 12, which may be slightly increased in thickness at 13 opposite the exposure element and observation window. When the plates 1 and 2 are tightly connected together by means of suitable clasps 17, the fabric 12 will maintain the interior of the casing in a light tight condition and will press upon the thin wall 14 so as to tightly hold the envelop 11 in its chamber while still permitting the paper 9 to be withdrawn from the envelop.

The thicker portion 13 presses the strip of paper 9 tightly against the exposure element 7 so that the characters therein will be very clearly printed upon the test strip, and will be clearly visible under the observation window. In case there is a tendency for the envelop 11 to be pulled along the pathway 10, in spite of the pressure upon wall 14, suitable positive means may be provided to check this undesirable motion. The portion of groove 10 in which the envelop rests may be slightly deeper than the rest of the groove forming a shoulder near the exposure element 7 against which the forward or open end of the envelop will abut as indicated in Fig. 2. Also shoulder 16 may be provided at the lower end of groove 10, the envelop 11 being provided with extra folds and abutments 15.

To facilitate the opening of the casing I provide the notch 19 in plate 1 and the notch 20 in plate 2, the said notches being adjacent the clasps and being in staggered relation so that the thumb of one hand can readily grasp one plate while the thumb of the other hand presses against the opposite plate. I have provided in the end of the plates the notches 21 to facilitate the gripping of the end of the sensitive photographic material.

In use the cover 5 is moved to its closed position and the strip of sensitive paper 9 contained in envelop 11 is inserted in the chamber in groove 10, the plates 1 and 2 being in their separated or open position. The operator then pulls the sensitive paper out of the end 22 of the envelop until it projects over the notches 21. He then springs the plates together and snaps the clasps 17, the actinometer being now ready to make a test.

The actinometer is placed in a position where it receives the same light as the subject to be photographed, the cover 5 being withdrawn to the position shown in Fig. 1 and the exposure element 7 facing directly toward the light rays. The operator exposes paper in this way for a definite or standard time, which with some forms of my apparatus may be, for example, fifteen seconds in outdoor work. He then moves the cover 5 so that it obscures the element 7 but permits the use of observation window 8. The end of the paper strip which can be reached through the notches 21 is pulled outwardly a sufficient distance to bring the areas and characters printed by the exposure on the test strip into view beneath the observation window; here they may be safely observed without danger of fogging because of the color of the window. A series of areas printed to different depths of color or blackness will appear and in the middle of each will be found the imprints of the characters. Of course, the number of areas and characters which print through will depend upon the sensitiveness of the paper, the light transmitting power of the areas and characters and the duration of the exposure together with the intensity of the light. When the instrument is properly calibrated the only variable will be the strength of the light and this will correspond to the least visible tint which appears upon the paper 9 after a standard test exposure. Thus in Fig. 3 spots 91, 92, and 93 have been printed, the latter spot being just visible. The operator then reads the characters appearing upon this least visible tint 93, which characters tell him that an exposure made with an aperture F8, and with a duration of a fifth of a second will give him a properly exposed negative in his camera. It sometimes occurs that a very faint and ghostly tint can be observed in the paper with the characters thereon so faint as to be practically illegible. The instrument is generally not calibrated to use this very weak tint, but the first tint is chosen on which the characters can be clearly read without effort.

I claim:

1. In an actinometer, an exposure element comprising a series of areas of graded light transmitting power, each area containing characters of different light transmitting power than the rest of the area, said characters on each area directly showing exposure data corresponding to that area.

2. In an actinometer, an exposure element comprising a strip of varying light transmitting properties, said strip containing, at portions of different light transmitting power, characters having different light transmitting power than the portion of strip in which they are located, the characters at each portion directly showing a combination of lens aperture and exposure time corresponding to that portion.

3. In an actinometer, an exposure element comprising a series of light transmitting areas, the light transmitting power being substantially uniform over each area but progressively varying from area to area throughout the series, there being in each area characters having different light transmitting power than the area, said characters on each area showing a lens aperture and exposure time corresponding to that area.

4. In an actinometer, an exposure element comprising a series of areas of graded light transmitting power, each area containing characters of different light-transmitting power than the rest of the area, said characters on each area directly showing a lens aperture and shutter-speed corresponding to that area, the characters showing the lens aperture being the same on each area and the shutter-speed characters being different.

5. In an actinometer, an exposure element comprising a series of areas of graded light transmitting power, each area containing characters of different light transmitting power than the rest of said area, the difference in light transmitting power between an area and its contained characters being substantially the same throughout the series.

6. In an actinometer, a sensitive photographic printing surface and an exposure plate thereover, said plate comprising a series of areas of graded light transmitting power, each area containing characters of greater light transmitting power than the rest of said area, the difference in light transmitting power between an area and its contained characters being substantially uniform throughout the series and conforming to the printing rate of said surface, whereby the characters in any area will be legibly printed on the surface when the surface under the rest of that area begins to print.

7. In an actinometer, a casing, an exposure element comprising portions of graded light transmitting power, an observation window in said casing, said casing having a pathway for sensitive photographic material beneath said element and window.

8. In an actinometer, a casing, an exposure element mounted on said casing and having graded light transmitting portions, an observation window mounted on said casing, said window being relatively opaque to actinic light but transparent to non-actinic visual light, said casing having a pathway for sensitive photographic material leading from said element to said window.

9. In an actinometer, a casing, an exposure element mounted on said casing and having graded light transmitting portions, an observation window mounted on said casing, said casing having a pathway for photographic sensitive material from the element to the window, and shiftable covering means for said element and said window.

10. In an actinometer, a casing, an exposure element mounted on said casing and having graded light transmitting portions, an observation window in said casing adjacent said element, said casing having a pathway for sensitive photographic material under said element and said window, and a cover shiftable on said casing to first cover said element and then cover both element and window.

11. In an actinometer, a casing, an exposure element in said casing having graded light transmitting portions, an envelop containing sensitive photographic material, and means for holding said envelop in the casing, said casing having a pathway for the sensitive material leading from said envelop to said exposure element.

12. In an actinometer, a casing, an exposure element in said casing having graded light transmitting portions, an observation window, an open ended envelop containing a strip of sensitive photographic paper, and means for holding said envelop relatively stationary in said casing, the open end of the envelop, the exposure element, and the window being in alinement.

13. In an actinometer, a casing comprising two plates of light proof material hinged at one side and provided with clasps at the other, an exposure element in one plate of the casing having graded light transmitting portions, an observation window in said plate adjacent said element, a cover mounted in guides on said plate to slide over said element and window, said casing having a pathway for a sensitive photographic strip beneath said element and window.

14. In an actinometer, a casing, an exposure element in said casing, having graded light transmitting portions, an envelop containing a sensitive photographic strip and coöperating means on the envelop and casing for holding the envelop relatively stationary, the casing having a pathway for the strip from the envelop to the exposure element.

15. In an actinometer, a casing comprising two plates of light proof material hinged together at one of their edges and provided with clasp means at their other edges, said last named edges having finger notches in staggered relation, there being an exposure element in one of said plates.

16. In an actinometer, a casing having an exposure element and an envelop containing a strip of sensitive photographic material, the casing having a chamber for longitudinally receiving and stationarily retaining said envelop and also having a pathway for said material leading from said chamber to said element.

17. In an actinometer, a casing, an exposure element in the casing having graded light transmitting portions, said casing having a pathway for sensitive photographic material beneath said element, and means for pressing said material against said element.

In testimony whereof, I have signed this specification in the presence of two witnesses this 25th day of April, 1917, at Rochester, N. Y.

JOHN G. CAPSTAFF.

Witnesses:
C. E. MARTIN,
JOHN E. SHEARER.